(12) United States Patent
Tsai

(10) Patent No.: US 10,737,761 B2
(45) Date of Patent: Aug. 11, 2020

(54) CAMBER ADJUSTMENT SYSTEMS AND METHODS FOR AIRCRAFT WINGS

(71) Applicant: THE BOEING COMPANY, Chicago, IL (US)

(72) Inventor: Kevin R. Tsai, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 294 days.

(21) Appl. No.: 15/957,283

(22) Filed: Apr. 19, 2018

(65) Prior Publication Data

US 2019/0322349 A1 Oct. 24, 2019

(51) Int. Cl.
*B64C 3/50* (2006.01)
(52) U.S. Cl.
CPC ........................ *B64C 3/50* (2013.01)
(58) Field of Classification Search
CPC .... B64C 9/16; B64C 9/18; B64C 9/20; B64C 2009/143; B64C 3/50
See application file for complete search history.

(56) References Cited

U.S. PATENT DOCUMENTS

| 4,448,375 A * | 5/1984 | Herndon | B64C 9/16 244/215 |
| 4,702,442 A * | 10/1987 | Weiland | B64C 9/16 244/216 |
| 9,079,652 B2 | 7/2015 | Yue | |
| 2013/0112814 A1* | 5/2013 | Yue | B64C 9/32 244/215 |
| 2013/0320151 A1* | 12/2013 | Kordel | B64C 9/16 244/215 |
| 2014/0145039 A1* | 5/2014 | Beyer | B64C 9/10 244/215 |
| 2016/0251074 A1* | 9/2016 | Tsai | B64C 9/16 244/215 |

* cited by examiner

*Primary Examiner* — Richard G Davis
(74) *Attorney, Agent, or Firm* — The Small Patent Law Group LLC; Joseph M. Butscher

(57) ABSTRACT

A camber adjustment system for a wing of an aircraft includes a droop panel that is configured to pivotally couple to a portion of a main body of a wing, a flap, and a coupler having a track that moveably couples the droop panel to the flap. The droop panel is configured to move in response to movement of the flap via the coupler.

20 Claims, 18 Drawing Sheets

CAMBER ADJUSTMENT SYSTEMS AND METHODS FOR AIRCRAFT WINGS

FIELD OF THE DISCLOSURE

Examples of the present disclosure generally relate to camber adjustment systems and methods for wings of aircraft.

BACKGROUND OF THE DISCLOSURE

A typical airplane includes wings having control surfaces, such as flaps. For example, a wing includes a flap that is moveably connected to a main body. A moveable droop panel is connected to the flap and the main body.

A droop (or drooping) panel is operable to provide increased camber to a wing as a flap is deployed. The camber of the wing (that is, an airfoil) relates to a thickness of the wing. In general, the camber determines an amount of lift that a wing generates as air flows around the wing. An increased camber generates increased lift. As such, droop panels are typically deployed during take-off and landing of an airplane.

The droop panel typically does not require a high rate of activation, or spoiling (that is, upward motion) capability. That is, the droop panel generally only needs to downwardly move below a plane of an upper surface of a wing to increase camber of the wing in front of the flap.

One type of droop panel is directly coupled to a dedicated droop actuator, such as a motor, that is used to move the droop panel. As can be appreciated, the droop actuator occupies space within a wing assembly, and adds weight to the airplane.

Further, a known droop panel may be connected to a flap through a plurality of pinned connections. However, the plurality of pinned connections may cause deviations in desired positional relationships between the flap and the droop panel. In short, a desired positional relationship may be difficult to control due to the various pinned connections.

SUMMARY OF THE DISCLOSURE

A need exists for a compact and efficient camber adjustment system that occupies a reduced amount of space within a wing. Further, a need exists for a lighter and less complex camber adjustment system. For example, a need exists for a camber adjustment system that is devoid of a dedicated droop actuator, and/or a relatively large number of pinned connections between a droop panel and a flap.

With those needs in mind, certain examples of the present disclosure provide a camber adjustment system for a wing of an aircraft. The camber adjustment system includes a droop panel that is configured to pivotally couple to a portion of a wing, a flap, and a coupler having a track that moveably couples the droop panel to the flap. The droop panel is configured to move in response to movement of the flap via the coupler. In at least one example, the camber adjustment system is devoid of a dedicated droop actuator.

The camber adjustment system may also include a flap actuator operatively coupled to the flap. The flap actuator is configured to move the flap between a retracted position and a fully deployed position.

The coupler may be integrally formed with the droop panel. In at least one example, the track is an arcuate channel formed through a portion of the coupler.

In at least one example, the droop panel includes an upper surface, a lower surface, a leading edge, and a trailing edge. A hinge coupling forwardly extends from the leading edge. A track coupling downwardly extends from the lower surface. The hinge coupling is configured to pivotally couple the droop panel to a hinge fitting of a main body of the wing. The track coupling downwardly extends from the lower surface. The track coupling couples the droop panel to the track of the coupler.

The coupler may include an arcuate head connected to an intermediate body, which, in turn, connects to a foot. The track extends through the head. The intermediate body is pivotally coupled to a hinge fitting of the main body.

In at least one example, the camber adjustment system includes a link arm that couples the coupler to the flap. The link arm may include a first end connected to a second end via a longitudinal body. The first end is pivotally coupled to the coupler. The second end is pivotally coupled to a flap attach fitting of the flap.

In at least one example, the coupler extends downwardly from a lower surface of the droop panel. A first link bar may moveably couple to the track. The first link bar is also configured to be pivotally coupled to a hinge fitting of a main body of the wing. A second link bar may be pivotally coupled to the first link bar. The second link bar is also pivotally coupled to a flap attach fitting of the flap.

Certain examples of the present disclosure provide a camber adjustment method for a wing of an aircraft. The camber adjustment method includes pivotally coupling a droop panel that is pivotally coupled to a portion of the wing to a flap via a coupler having a track (the track may be an arcuate channel formed through a portion of the coupler) and moving the droop panel in response to movement of the flap via the pivotally coupling.

The camber adjustment method may also include operatively coupling a flap actuator to the flap, and moving the flap between a retracted position and a fully deployed position via the operatively coupling.

In at least one example, the camber adjustment method includes integrally forming the coupler with the droop panel.

The camber adjustment method may include pivotally coupling a hinge coupling of the droop panel to a hinge fitting of a main body of the wing. The pivotally coupling the droop panel may include coupling a track coupling of the droop panel to the track of the coupler.

The camber adjustment method may include pivotally coupling an intermediate body of the coupler to a hinge fitting of a main body of the wing.

The pivotally coupling the droop panel may include coupling the coupler to the flap through a link arm. The coupling may include pivotally coupling a first end of the link arm to the coupler, and pivotally coupling a second end of the link arm to a flap attach fitting of the flap.

The pivotally coupling the droop panel may include moveably coupling a first link bar coupled to the track, pivotally coupling the first link bar to a hinge fitting of a main body of the wing, pivotally coupling a second link bar to the first link bar, and pivotally coupling the second link bar to a flap attach fitting of the flap.

Certain examples of the present disclosure provide an aircraft that includes a fuselage, and wings outwardly extending from the fuselage. Each of the wings includes a main body and a camber adjustment system connected to the main body.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition may include additional elements not having that condition.

Certain examples of the present disclosure provide camber adjustment systems and methods for aircraft wings. The camber adjustment system includes a droop panel coupled to a flap via a coupler having a track. In at least one example, the camber adjustment system is devoid of a dedicated droop actuator. Instead, the droop panel moves in response to motion of the flap, which is operatively connected to a flap actuator.

Examples of the present disclosure allow for a desired and precise positional relationship between the droop panel and the flap over an entire range of motion of the flap. A timing schedule for the droop panel and the flap is dictated by the shape and length of the track of the coupler, thereby allowing every positional and temporal requirement between the droop panel and the flap to be met. Moreover, the camber adjustment system allows for configuration flexibility so as to be incorporated into smaller and tighter spaces (as certain wing designs are becoming lighter and more compact).

The camber adjustment systems and methods include a combination of pinned joints and a coupler having a track. The track increases the positional accuracy of the droop panel in relation to the flap over an entire range of flap motion.

Figure 1:
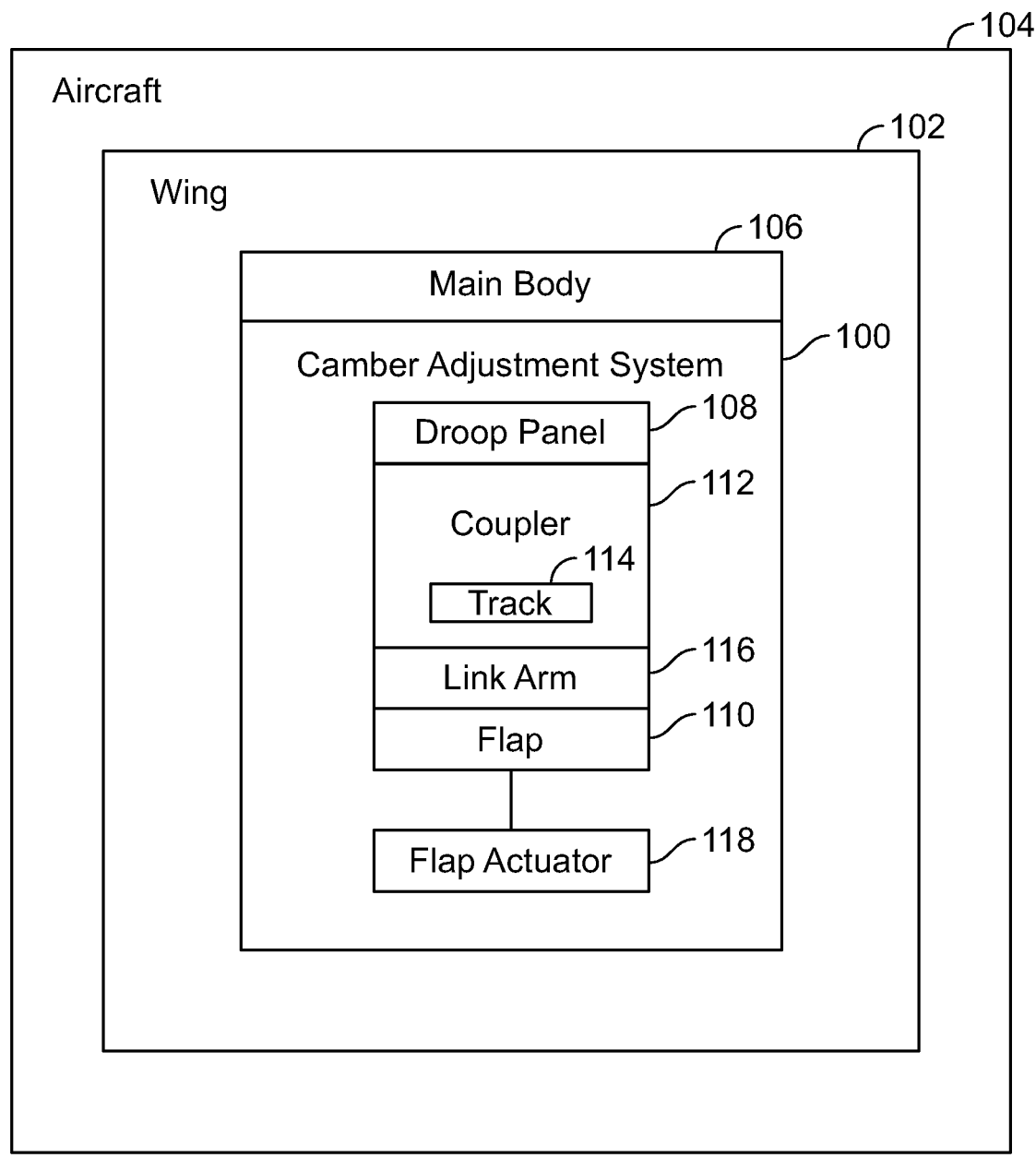
FIG. 1 illustrates a schematic block diagram of a camber adjustment system of a wing of an aircraft, according to an example of the present disclosure.

FIG. 1 illustrates a schematic block diagram of a camber adjustment system 100 of a wing 102 of an aircraft 104, according to an example of the present disclosure. The wing 102 includes a main body 106 and the camber adjustment system 100 connected to the main body 106.

The camber adjustment system 100 includes a droop panel 108 moveably coupled to a flap 110 via a coupler 112 having a track 114. In at least one example, the droop panel 108 includes a guide pin moveably retained within the track 114. The coupler 112 may be pivotally coupled to a beam fitting within the main body 106. A link arm 116 may pivotally couple to the coupler 112 and the flap 110. Alternatively, the flap 110 may pivotally couple directly to the coupler 112 without the use of the link arm 116.

The coupler 112 may be a separate and distinct structure between the droop panel 108 and the flap 110. In at least one other example, the coupler 112 may be an integral portion of the droop panel 108. In at least one other example, the coupler 112 may be an integral portion of the flap 110.

As described therein, the track 114 may be an arcuate channel (for example, a slot) formed through a portion of the coupler 112. The arcuate track 114 may be sized and shaped to synchronize a desired positional relationship of the droop panel 108 in relation to the flap 110 over an entire range of motion of the flap 110 and the droop panel 108.

A flap actuator 118 is operatively coupled to the flap 110. The flap actuator 118 is configured to move the flap 110 between a retracted position and a fully deployed position. The flap actuator 118 may be one or more of an electric motor, a hydraulic motor, a pneumatic motor, one or more powered pistons, and/or the like that is configured to move the flap 110 between a retracted (such as a stowed) position and a deployed (for example, fully extended) position.

In operation, as the flap actuator 118 operates to move the flap 110, the droop panel 108 moves in response to the motion of the flap 110 by way of the coupler 112 that couples the droop panel 108 to the flap 110. The camber adjustment system 100 is devoid of a dedicated droop actuator directly coupled to the droop panel 108. The lack of a dedicated droop actuator leads to a more compact and lighter camber adjustment system 100 that occupies less space within the wing 102 (thereby allowing for other components to be positioned and/or routed therein) and reducing the weight of the wing 102.

The camber adjustment system 100 for the wing 102 of the aircraft 103 includes the droop panel 108 that is configured to pivotally couple to a portion (such as a hinge fitting) of the main body 106 of the wing 102, the flap 110, and the coupler 112 having the track 114, that moveably couples the droop panel 108 to the flap 110. The droop panel 108 is configured to move in response to movement of the flap 110 via the coupler 112.

Figure 2:
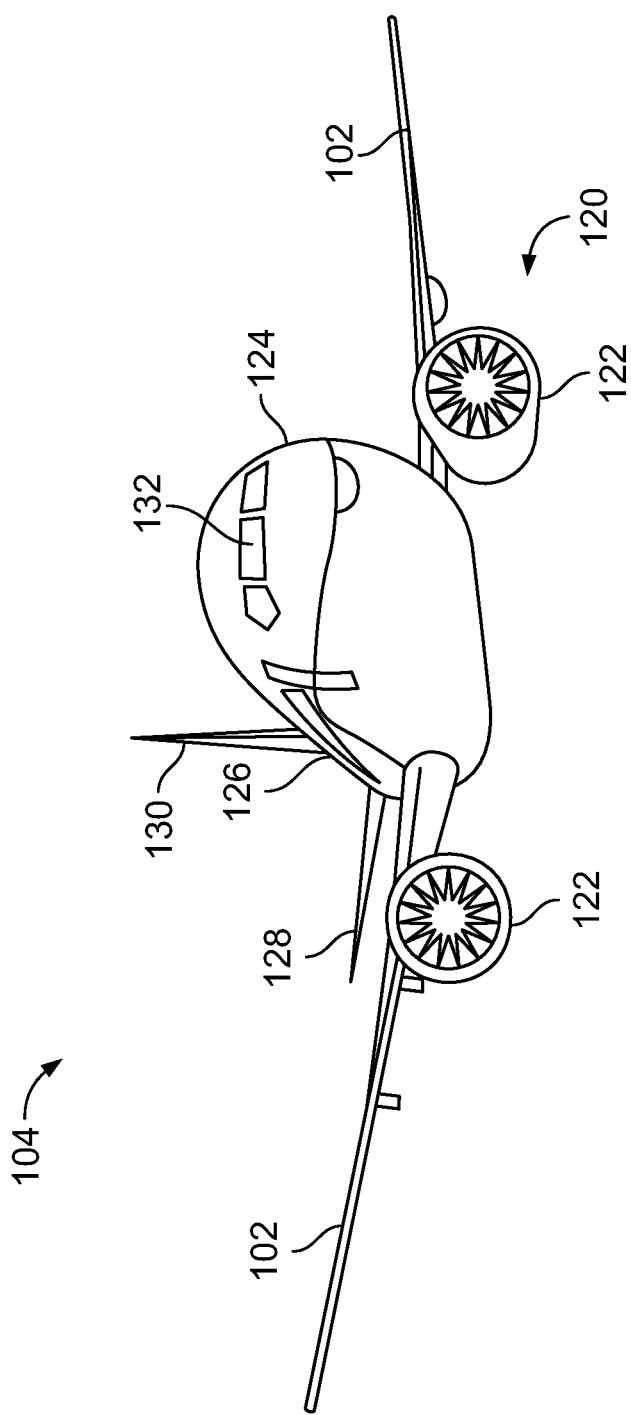
FIG. 2 illustrates a front perspective view of an aircraft, according to an example of the present disclosure.

FIG. 2 illustrates a front perspective view of an aircraft 104, according to an example of the present disclosure. The aircraft 104 includes a propulsion system 120 that may include two turbofan engines 122, for example. Optionally, the propulsion system 120 may include more engines 122 than shown. The engines 122 may be carried by wings 102 of the aircraft 104. In other examples, the engines 122 may be carried by a fuselage 124 and/or an empennage 126. The empennage 126 may also support horizontal stabilizers 128 and a vertical stabilizer 130. The fuselage 124 of the aircraft 104 defines an internal cabin, which may include a cockpit 132, one or more work sections (for example, galleys, personnel carry-on baggage areas, and the like), one or more passenger sections (for example, first class, business class, and coach sections), and/or the like.

Figure 3:
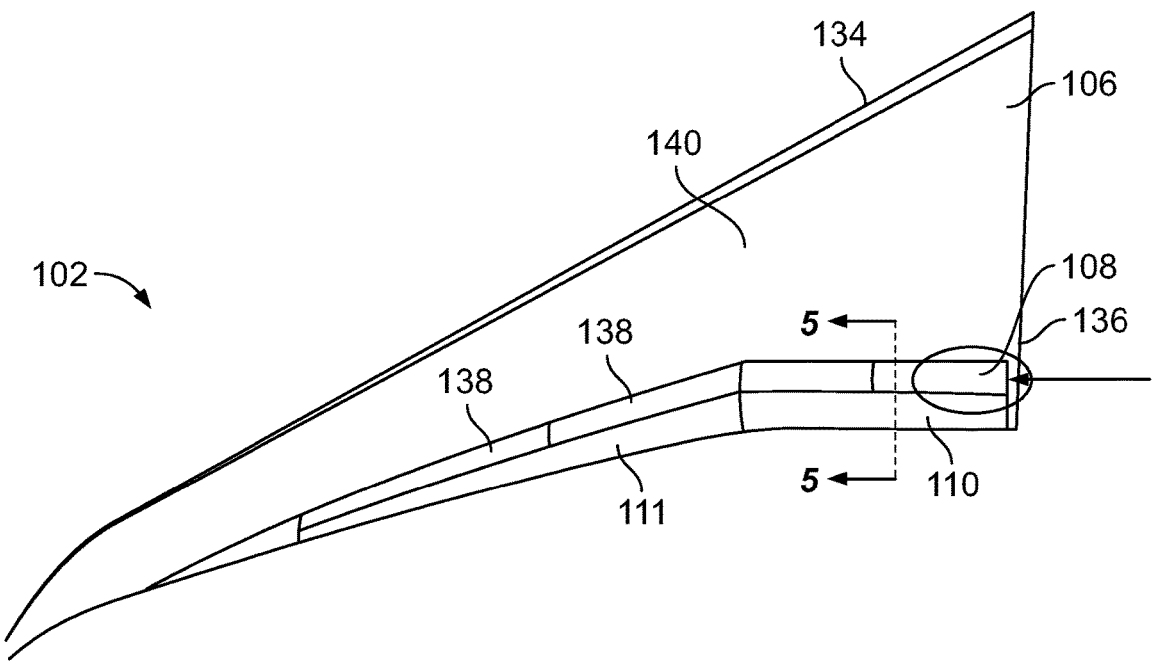
FIG. 3 illustrates a top plan view of a wing, according to an example of the present disclosure.

FIG. 3 illustrates a top plan view of a wing 102, according to an example of the present disclosure. The wing 102 includes the main body 106 having a leading rounded edge 134 and a trailing edge 136. One or more droop panels 108 extend from the trailing edge 136. The droop panel(s) 108 are inboard (that is, closer to the fuselage 124 shown in FIG. 2) from spoilers 138, which are configured to be downwardly moved below a plane of an upper surface 140 of the wing 102 and upwardly moved above the plane of the upper surface 140 of the wing 102. In contrast, the droop panel(s) 108 may be configured to only be moved below the plane of the upper surface 140 of the wing 102.

Flaps 110 and 111 are positioned behind (that is, towards the aft of the aircraft 104 shown in FIG. 2) the droop panel 108 and the spoilers 138. At least a portion of the flap 110 is positioned underneath the droop panel 108.

Figure 4:
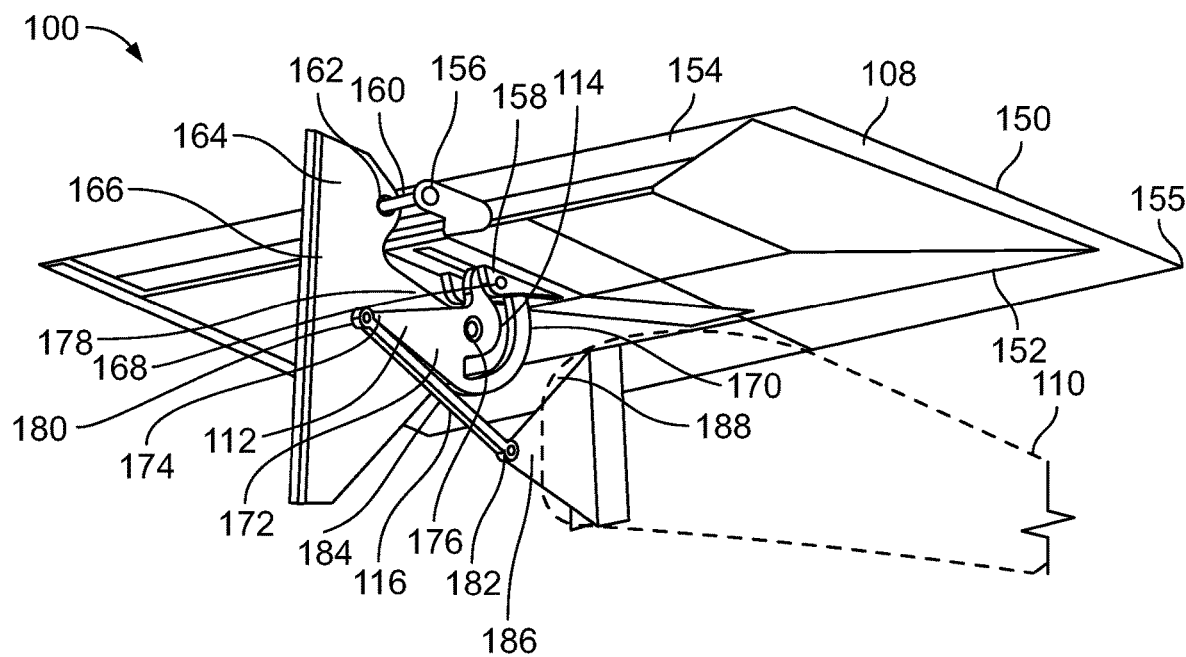
FIG. 4 illustrates a perspective front view of a camber adjustment system, according to an example of the present disclosure.

FIG. 4 illustrates a perspective front view of the camber adjustment system 100, according to an example of the present disclosure. The droop panel 108 includes an upper surface 150 connected to a lower surface 152, a leading edge 154, and a trailing edge 155. A hinge coupling 156 forwardly extends from the leading edge 154, while a track coupling 158 extends from the lower surface 152. The track coupling 158 may be positioned closer to the trailing edge 155 than the hinge coupling 156.

The hinge coupling 156 includes a pivot pin 160 that is pivotally retained within a reciprocal opening 162 formed through an upper portion 164 of a hinge fitting 166. The hinge fitting 166 is fixed to and/or within the main body 106 of the wing 102 (shown in FIG. 1, for example). The hinge fitting 166 may be part of or otherwise secured to a spoiler beam, which may be an I-beam extending through at least a portion of the wing 102. Optionally, the hinge coupling 156 may include the reciprocal opening 162, and the upper portion 164 of the hinge fitting 166 may include the pivot pin 160.

The track coupling 158 downwardly extends from the lower surface 152 of the droop panel 108. The track coupling 158 includes a guide pin 168 that is retained within the track 114 of the coupler 112.

In at least one example, the coupler 112 includes an arcuate head 170 connected to an intermediate body 172, which, in turn, connects to a foot 174. The track 114 is an arcuate, curved track that extends through the head 170. For example, the track 114 may be a curved channel that extends between and through opposite sides of the head 170.

The intermediate body 172 includes a pivot pin 176 that is pivotally retained within a reciprocal opening (hidden from view in FIG. 4) formed in a rearwardly-directed spur 178 of the hinge fitting 166. As such, the coupler 112 is pivotally coupled to the hinge fitting 166. Optionally, the hinge fitting 166 may include the pivot pin 176 and the intermediate body 172 may include a reciprocal opening that pivotally retains the pivot pin 176.

The link arm 116 (such as a rod, beam, or the like) includes a first end 180 connected to a second end 182 via a longitudinal body 184. The first end 180 is pivotally coupled to the foot 174, such as through a pivot pin pivotally retained within a reciprocal opening. The second end 182 is pivotally coupled to a flap attach fitting 186 of the flap 110. As shown, the flap attach fitting 186 extends from a fore end of the flap 110.

In operation, the flap actuator 118 (shown in FIG. 1) drives the flap 110 to move between a retracted position and a fully deployed position. In response to the flap 110 moving, the droop panel 108 moves by way of the coupler 112, as described herein.

Figure 5:
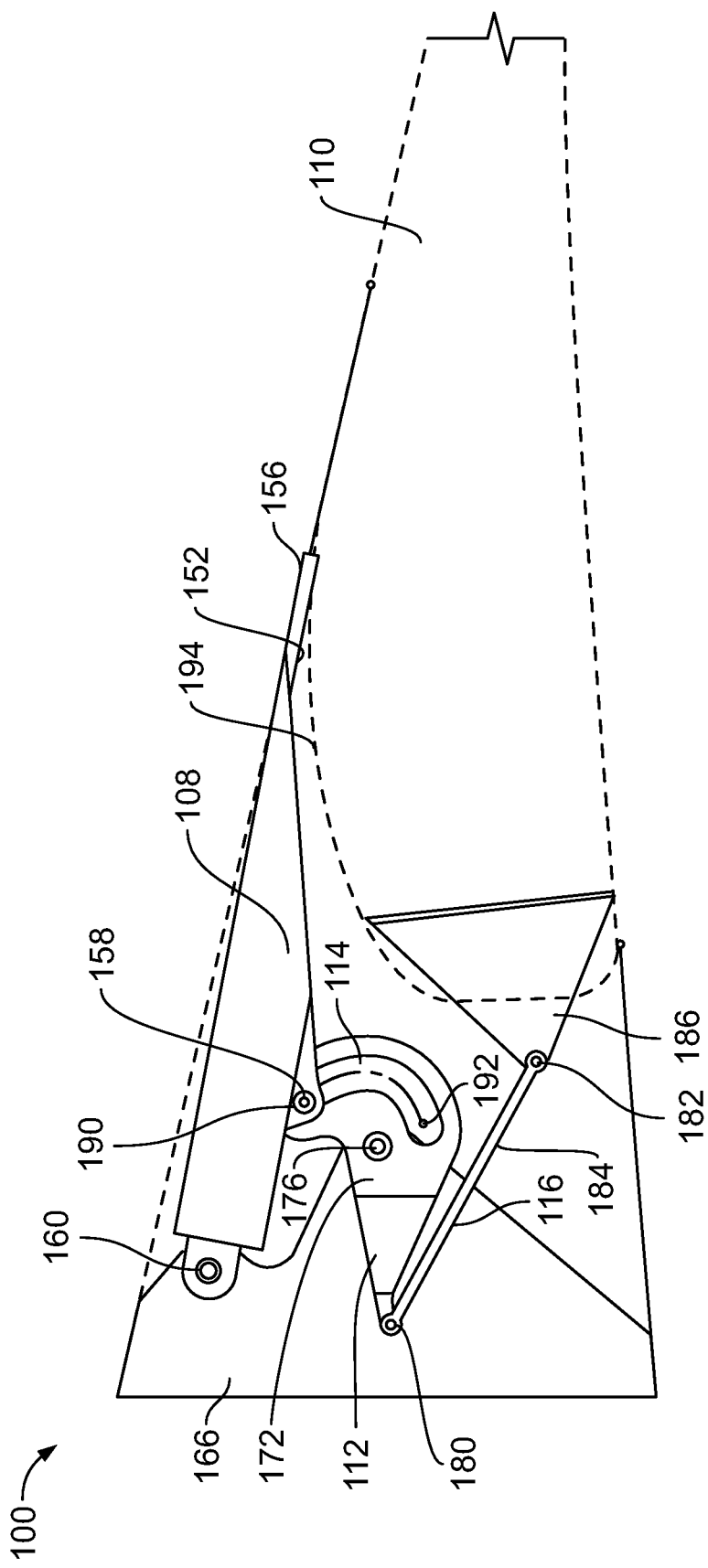
FIG. 5 illustrates a cross-sectional view of a camber adjustment system through line 5-5 of FIG. 3, according to an example of the present disclosure.

FIG. 5 illustrates a cross-sectional view of the camber adjustment system 100 through line 5-5 of FIG. 3, according to an example of the present disclosure. As shown in FIG. 5, the flap 110 is in the retracted position. That is, the flap 110 is not deployed. The droop panel 108 is positioned in front of and over the fore end 188 of the flap 110. In the retracted position, the lower surface 152 of the trailing edge 155 of the droop panel 108 overlays and may abut into an upper surface 194 of the flap 110.

When the flap 110 is in the retracted position, the track coupling 158 is positioned within a first end 190 of the track 114 of the coupler 112, while an opposite second end 192 of the track 114 is substantially below the pivot pin 176 of the intermediate body 172. Further, the link arm 116 is retracted, such that a substantial portion of the longitudinal body 184 is positioned between the coupler 112.

Figure 6:
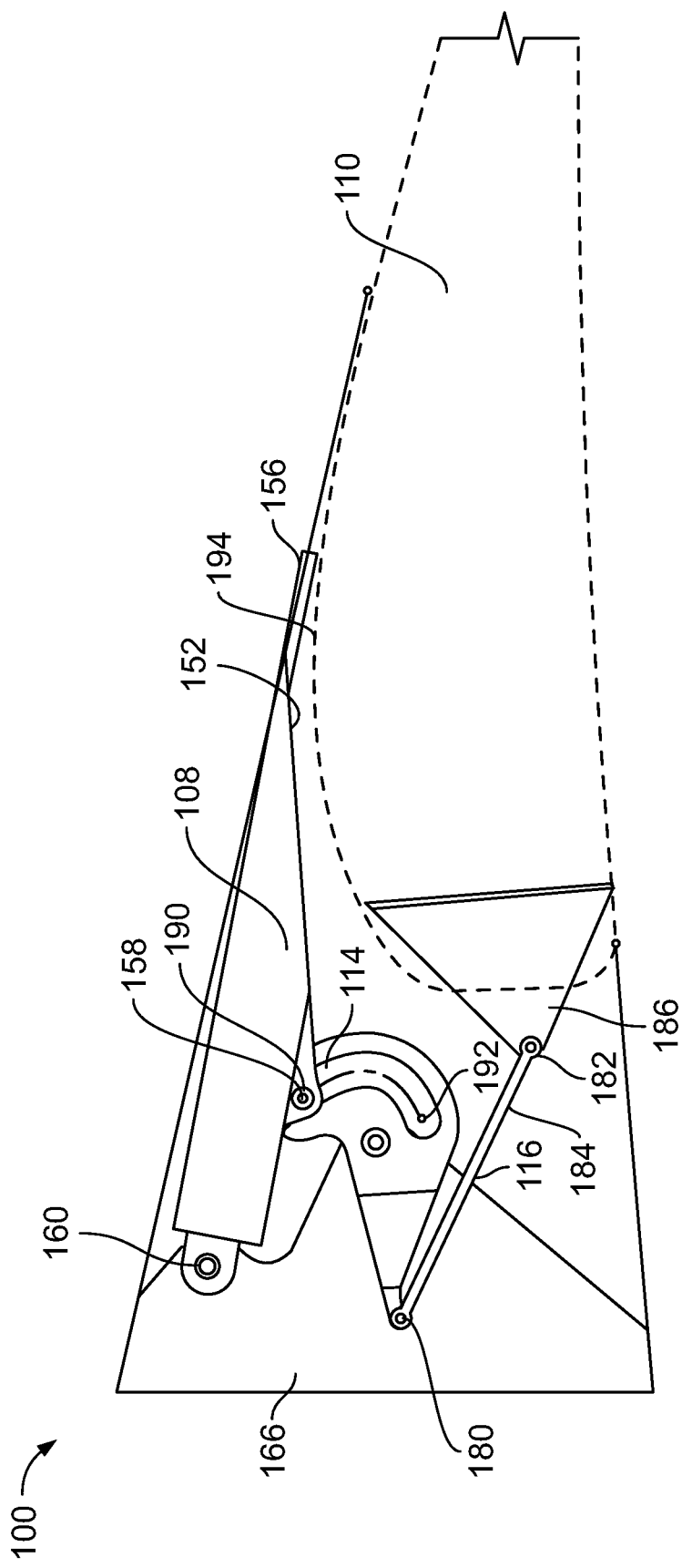
FIG. 6 illustrates a cross-sectional view of a camber adjustment system having a flap 10% deployed, according to an example of the present disclosure.
Figure 7:
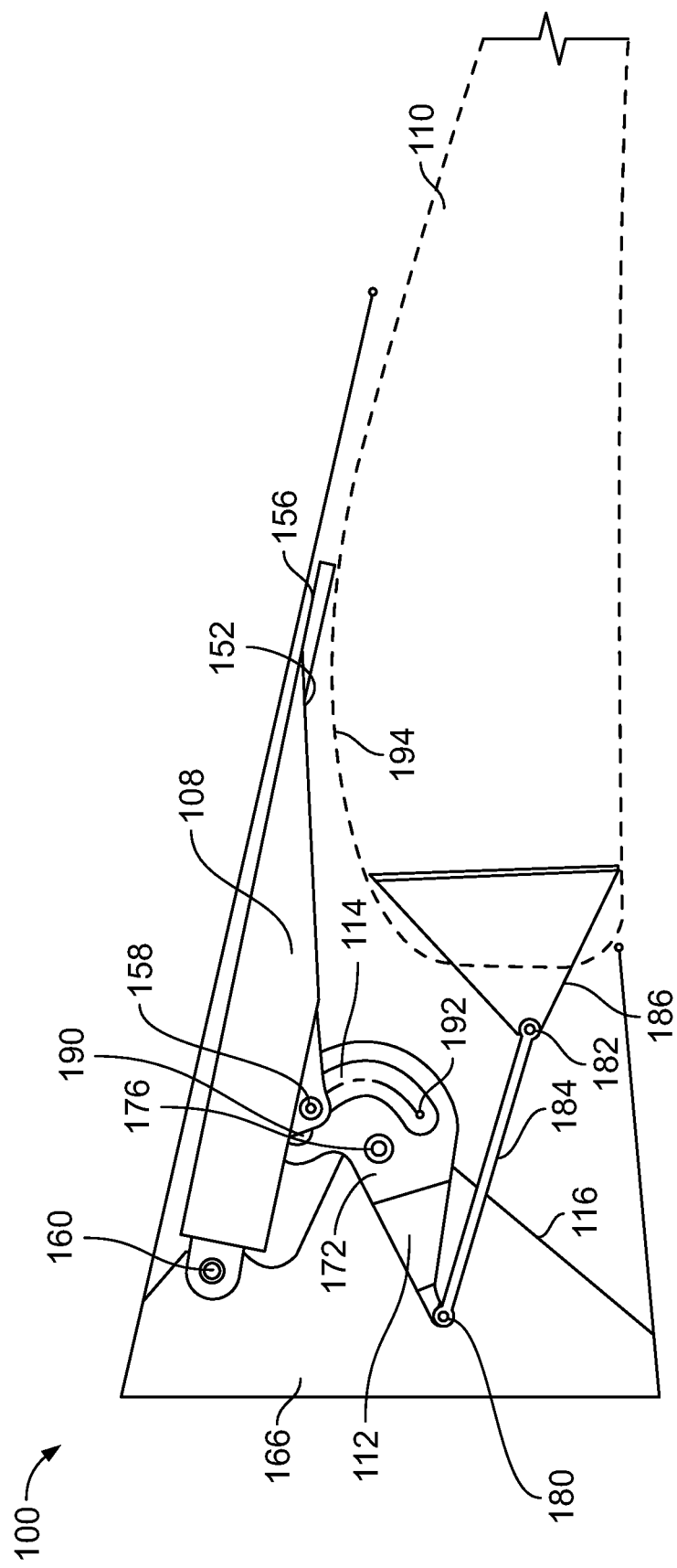
FIG. 7 illustrates a cross-sectional view of a camber adjustment system having a flap 20% deployed, according to an example of the present disclosure.
Figure 8:
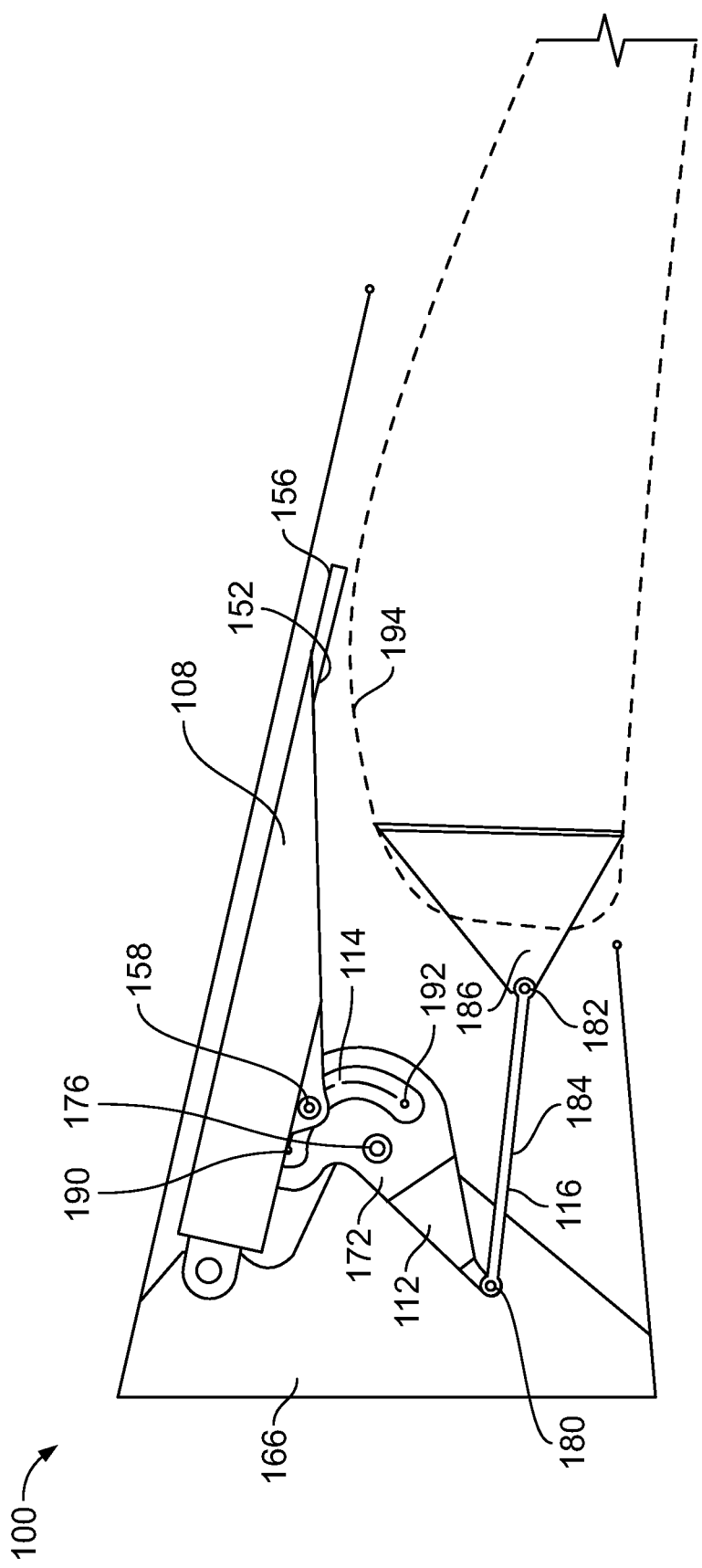
FIG. 8 illustrates a cross-sectional view of a camber adjustment system having a flap 30% deployed, according to an example of the present disclosure.
Figure 9:
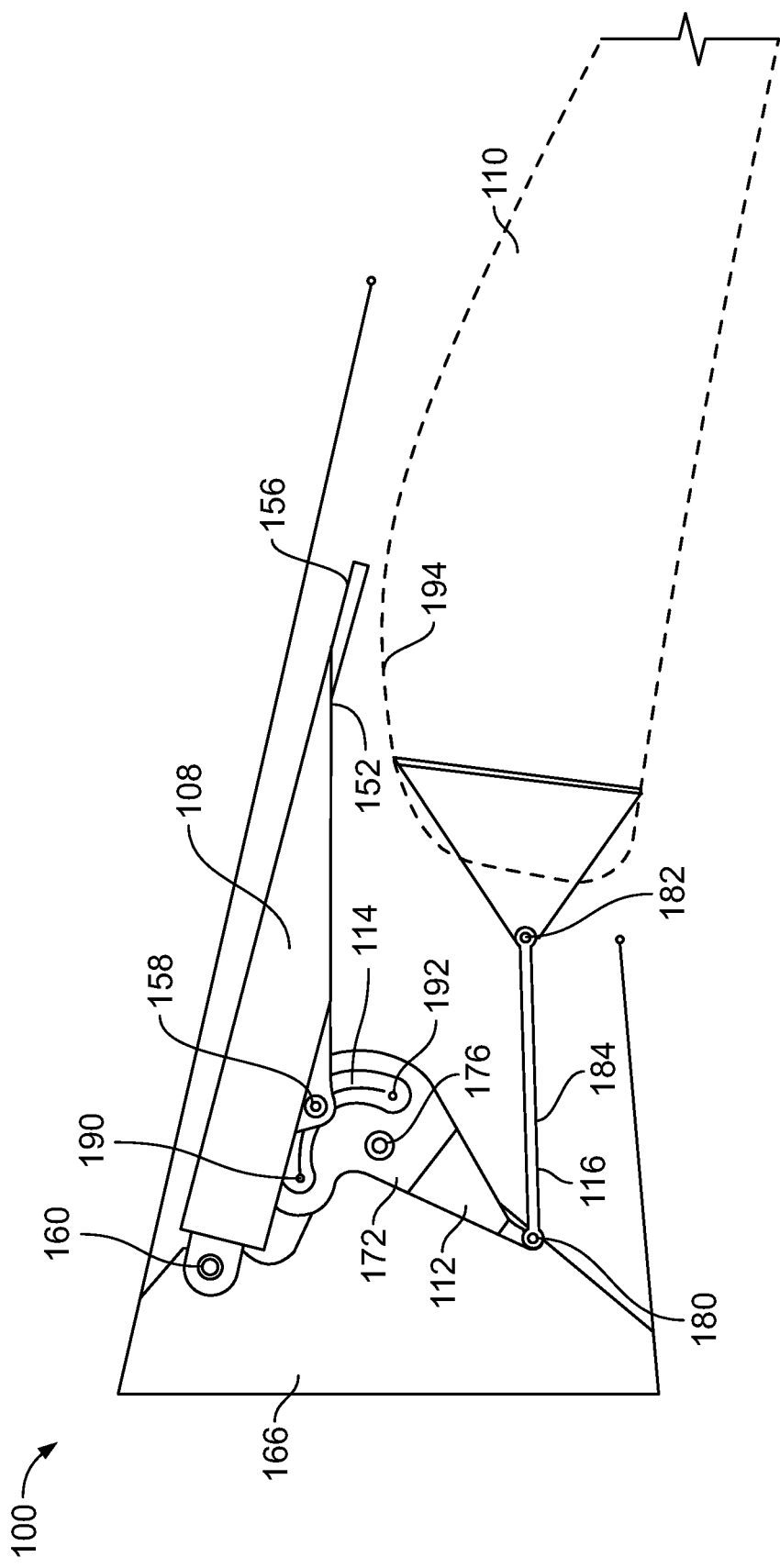
FIG. 9 illustrates a cross-sectional view of a camber adjustment system having a flap 40% deployed, according to an example of the present disclosure.
Figure 10:
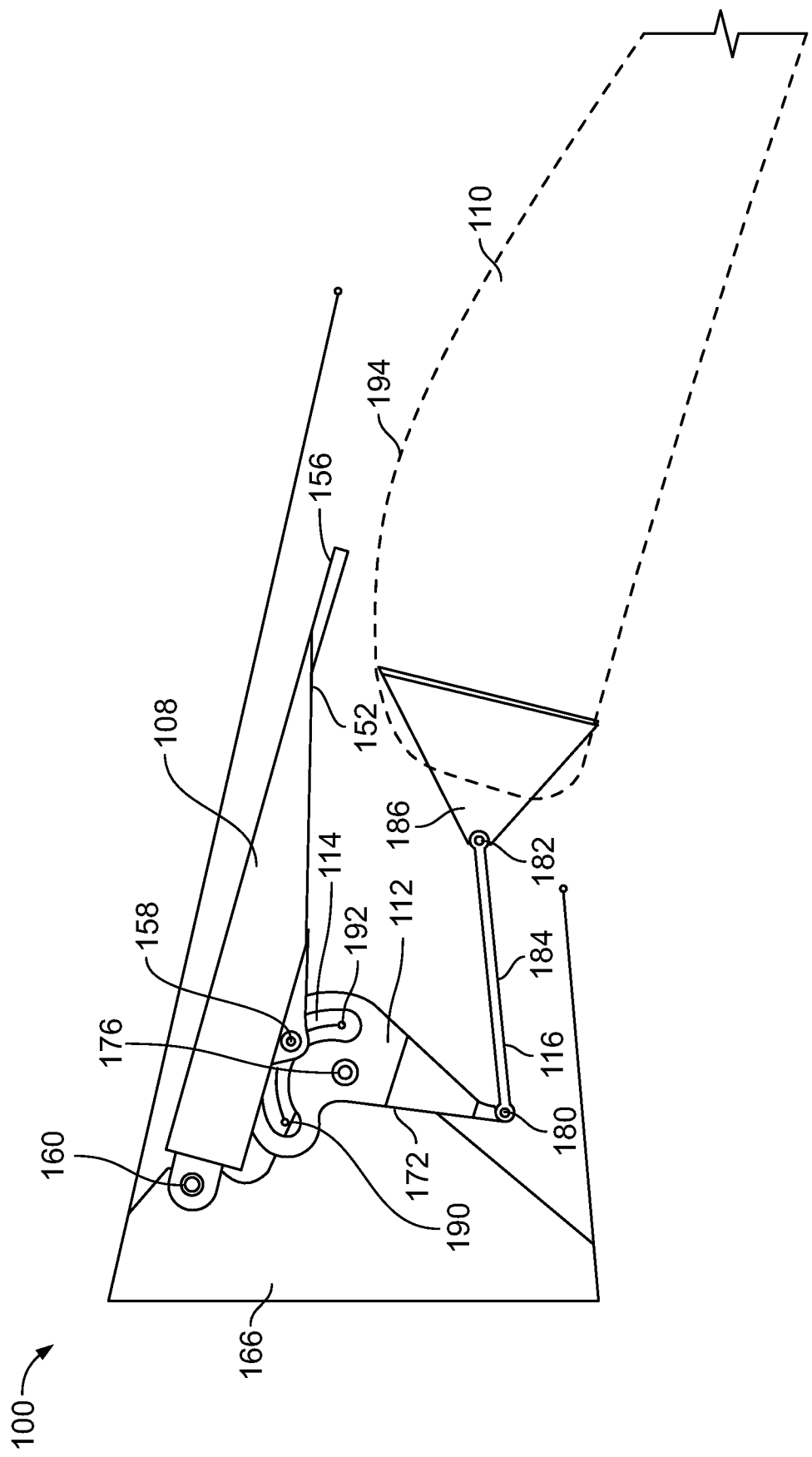
FIG. 10 illustrates a cross-sectional view of a camber adjustment system having a flap 50% deployed, according to an example of the present disclosure.
Figure 11:
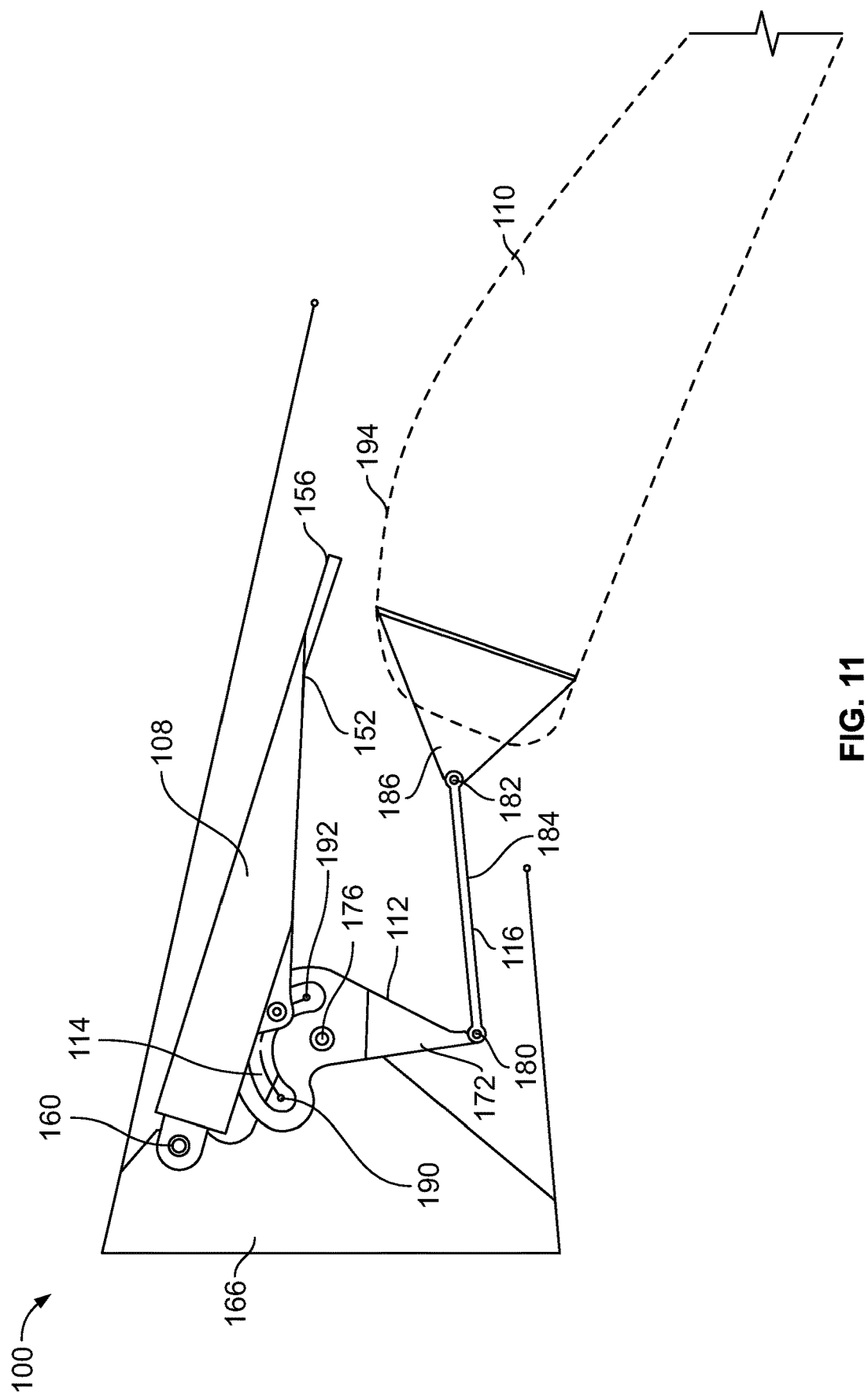
FIG. 11 illustrates a cross-sectional view of a camber adjustment system having a flap 60% deployed, according to an example of the present disclosure.
Figure 12:
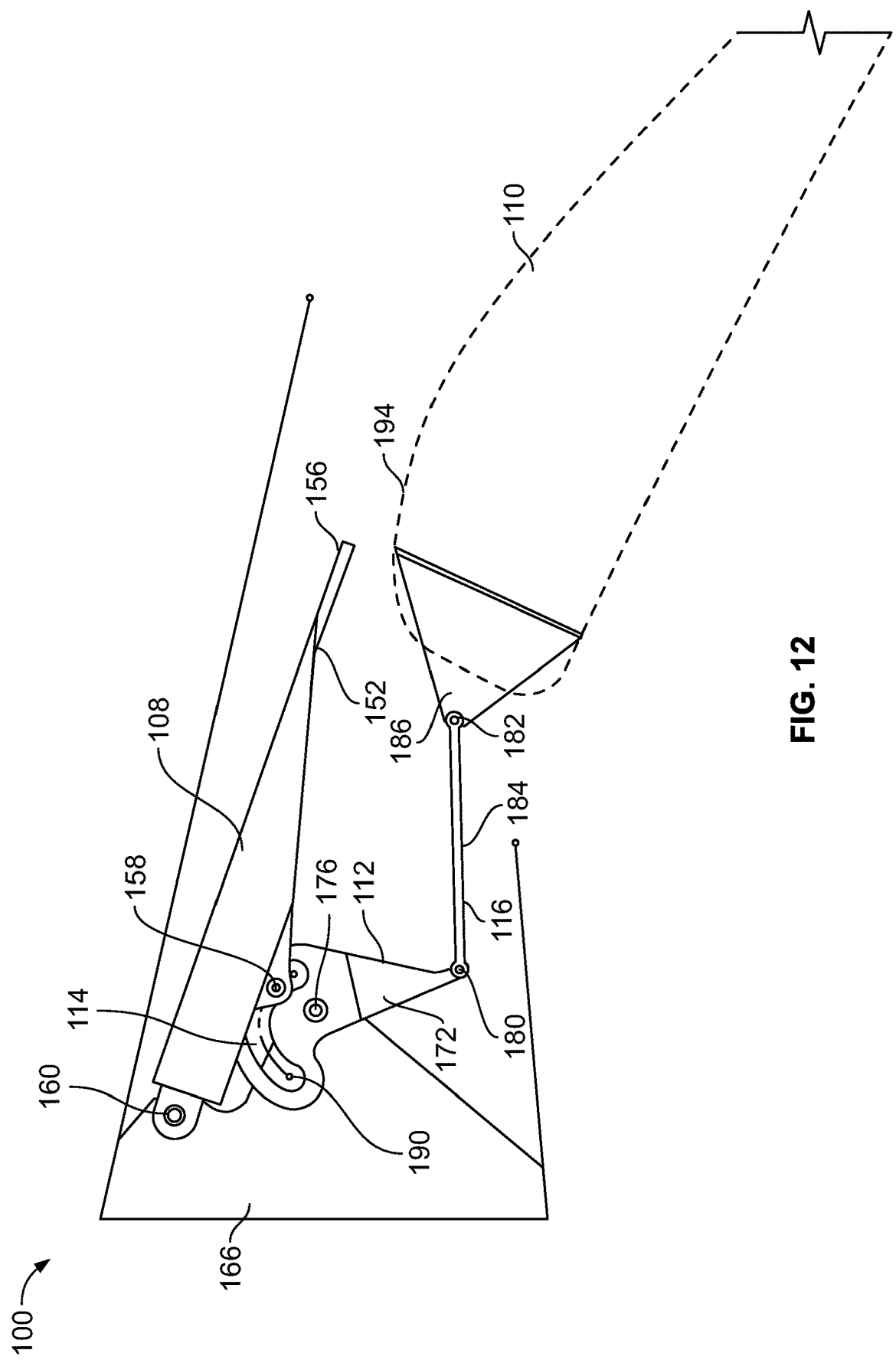
FIG. 12 illustrates a cross-sectional view of a camber adjustment system having a flap 70% deployed, according to an example of the present disclosure.
Figure 13:
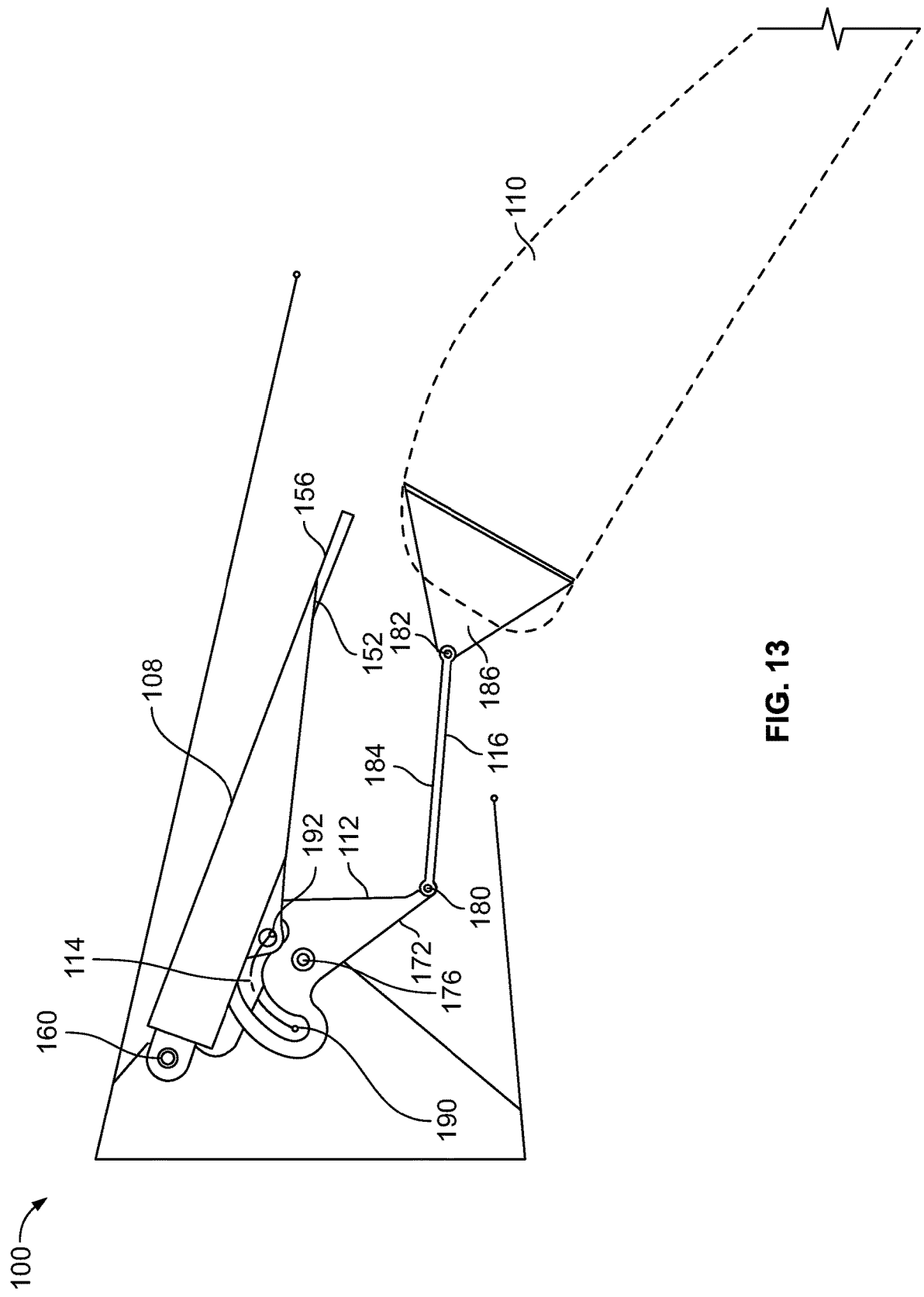
FIG. 13 illustrates a cross-sectional view of a camber adjustment system having a flap 80% deployed, according to an example of the present disclosure.
Figure 14:
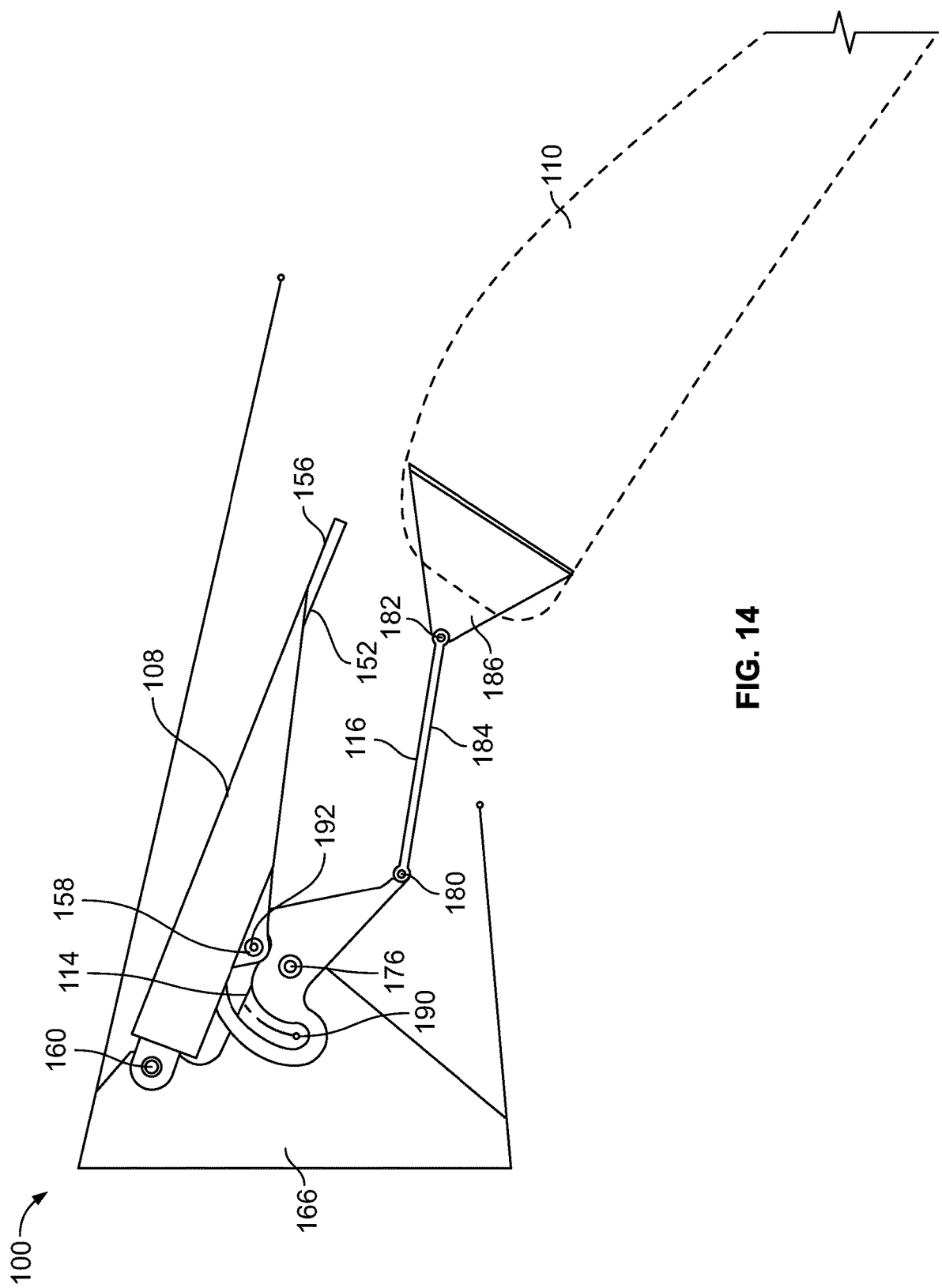
FIG. 14 illustrates a cross-sectional view of a camber adjustment system having a flap 90% deployed, according to an example of the present disclosure.
Figure 15:
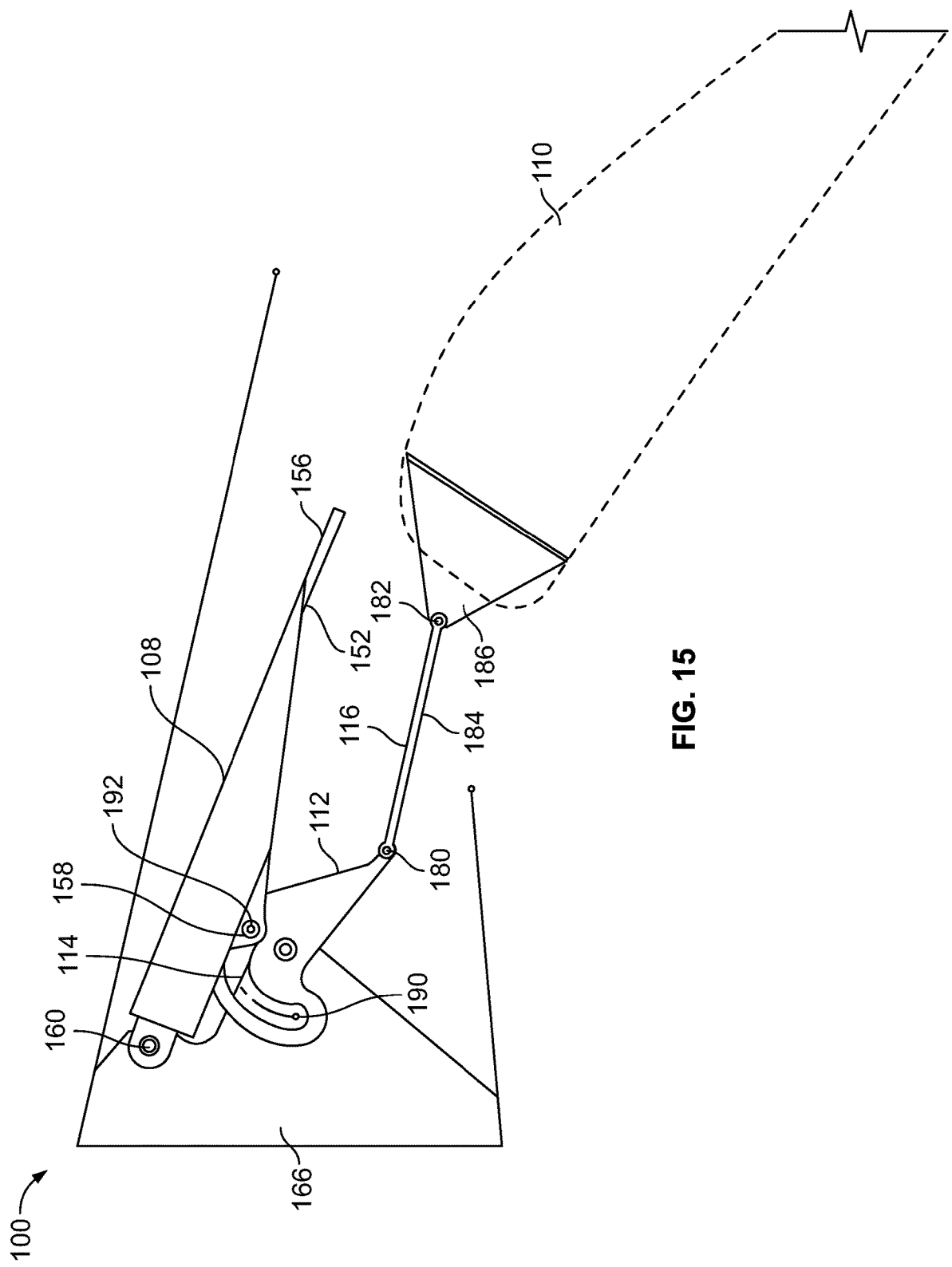
FIG. 15 illustrates a cross-sectional view of a camber adjustment system having a flap fully deployed, according to an example of the present disclosure.

FIG. 6 illustrates a cross-sectional view of the camber adjustment system 100 having the flap 110 10% deployed.
FIG. 7 illustrates a cross-sectional view of the camber adjustment system 100 having the flap 110 20% deployed.
FIG. 8 illustrates a cross-sectional view of the camber adjustment system 100 having the flap 110 30% deployed.
FIG. 9 illustrates a cross-sectional view of the camber adjustment system 100 having the flap 110 40% deployed.
FIG. 10 illustrates a cross-sectional view of the camber adjustment system 100 having the flap 110 50% deployed.
FIG. 11 illustrates a cross-sectional view of the camber adjustment system 100 having the flap 110 60% deployed.
FIG. 12 illustrates a cross-sectional view of the camber adjustment system 100 having the flap 110 70% deployed.
FIG. 13 illustrates a cross-sectional view of the camber adjustment system 100 having the flap 110 80% deployed.
FIG. 14 illustrates a cross-sectional view of the camber adjustment system 100 having the flap 110 90% deployed.
FIG. 15 illustrates a cross-sectional view of the camber adjustment system 100 having the flap 110 fully (that is, 100%) deployed.

Referring to FIGS. 1-15, as the flap actuator 118 moves the flap 110 from the retracted (that is, 0% deployed) state shown in FIG. 5 to the fully deployed position shown in FIG.

15, the flap attach fitting 186 of the flap 110 pulls link arm 116 rearwardly towards a horizontal orientation and then downwardly via the pivot couplings between the first end 180 and the coupler 112 and the second end 182 and the flap attach fitting 186. During such motion, the longitudinal body 184 moves outwardly and away from under the coupler 112. In particular, when the flap 110 is in the retracted position (shown in FIG. 5), the first end 180 of the link arm 116 is above a height of the second end 182. During motion of the flap 110, the first end 180 and the second end 182 move towards the same height, such that the link arm 116 is generally horizontal, as shown in FIG. 12. With continued motion towards the fully deployed position, the second end 182 again moves to a height below that of the first end 180, while the longitudinal body 184 extends outwardly away from the coupler 112.

During the motion of the flap 110, the coupler 112 pivots from a generally horizontal position shown in FIG. 5 to a generally vertical position shown in FIG. 12 towards an opposite horizontal position shown in FIG. 15 via the pivotal coupling between pivot pin 176 and the hinge fitting 166, and the track coupling 158 moving through the arcuate track 114 of the coupler 112 between the first end 190 and the second end 192.

Further, as the flap 110 moves from the retracted position to the fully deployed position, the coupler 112 causes the droop panel 108 to be pulled downwardly about the pivotal connection between the pivot pin 160 and the hinge fitting 166, while the flap 110 separates from the droop panel 108 (that is, the upper surface 194 of the flap 110 separates from the lower surface 152 of the droop panel 108). As such, the camber of the wing 102 increases as the flap 110 moves between the retracted position (shown in FIG. 5) to the fully deployed position (shown in FIG. 15). The motion of the flap 110 causes the droop panel 108 to move in response thereto, by virtue of the coupler 112 and the link arm 116 coupling the droop panel 108 to the flap 110. The motion of the droop panel 108, the flap 110, and the coupler 112 is reversed as the flap actuator 118 moves the flap 110 from the fully deployed position (shown in FIG. 15) back to the retracted position (shown in FIG. 5).

The track 114 may extend over a curved length that is greater or less than shown. With increased length of the track 114, the coupler 112 may rotate about the pivotal coupling with the hinge fitting 166 between two horizontal positions that are 180 degrees apart from one another.

Figure 16:
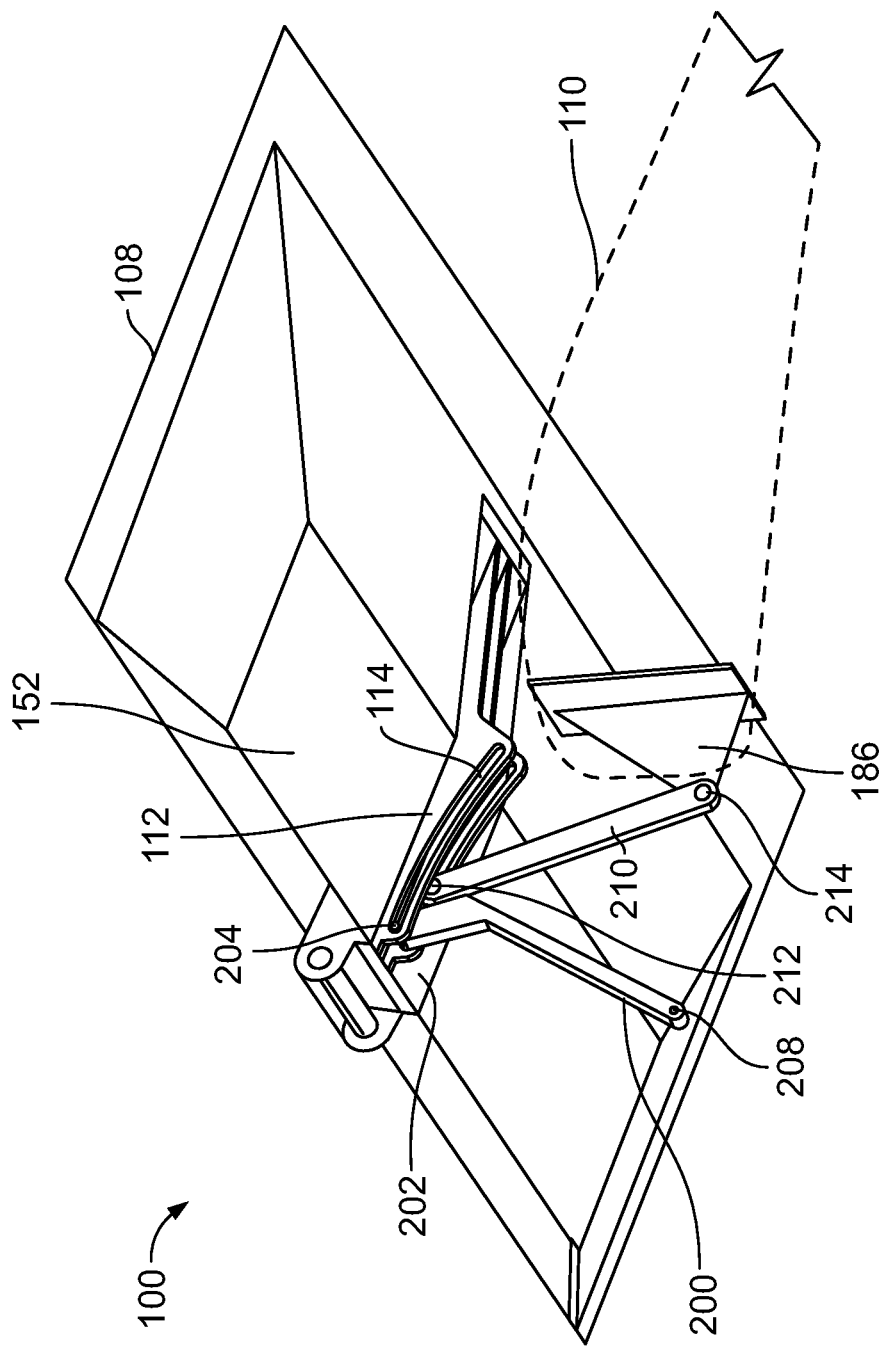
FIG. 16 illustrates a perspective front view of a camber adjustment system, according to an example of the present disclosure.

FIG. 16 illustrates a perspective front view of a camber adjustment system 100, according to an example of the present disclosure. In this example, the coupler 112 extends downwardly from the lower surface 152 of the droop panel 108. For example, the coupler 112 may be integrally formed with the droop panel 108, instead of being an intermediate piece between the droop panel 108 and the flap 110.

The arcuate track 114 may extend through a portion of the coupler 112. A first link bar 200 having a first end 202 is moveably coupled to the track 114, such as via a guide pin 204 moveably retained within the track 114. A second end 208 of the first link bar 200 that is opposite from the first end 202 is pivotally coupled to a hinge fitting, such as the hinge fitting 166 of FIG. 4. As shown, the first link bar 200 may be canted, such that the second end 208 is underneath and forwardly offset from the first end 202. A second link bar 210 has a first end 212 pivotally coupled to the first link bar 200 proximate to the first end 202, and an opposite second end 214 pivotally coupled to the flap attach fitting 186.

Figure 17:
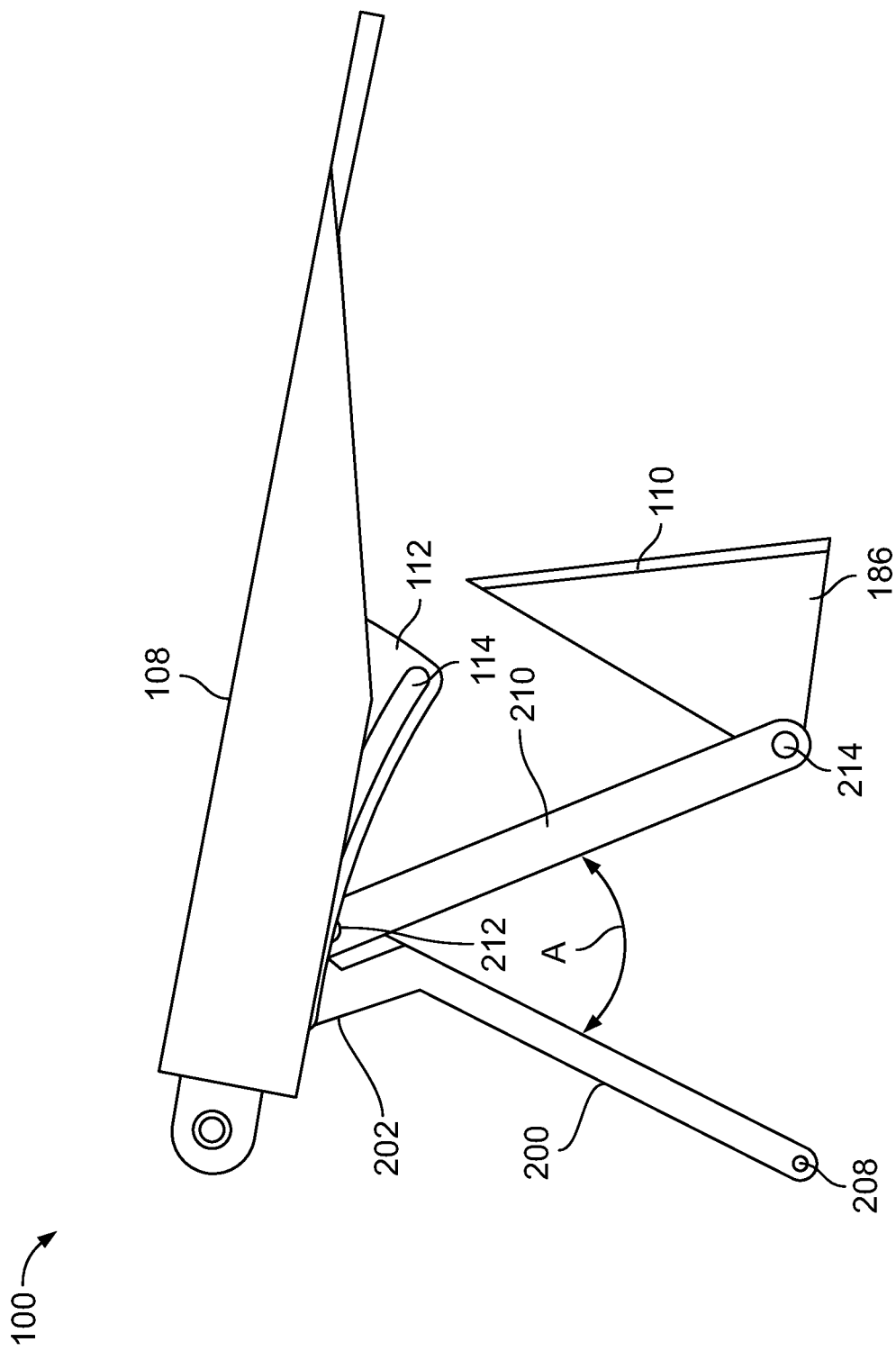
FIG. 17 illustrates a cross-sectional view of a camber adjustment system with the flap in a retracted position, according to an example of the present disclosure.
Figure 18:
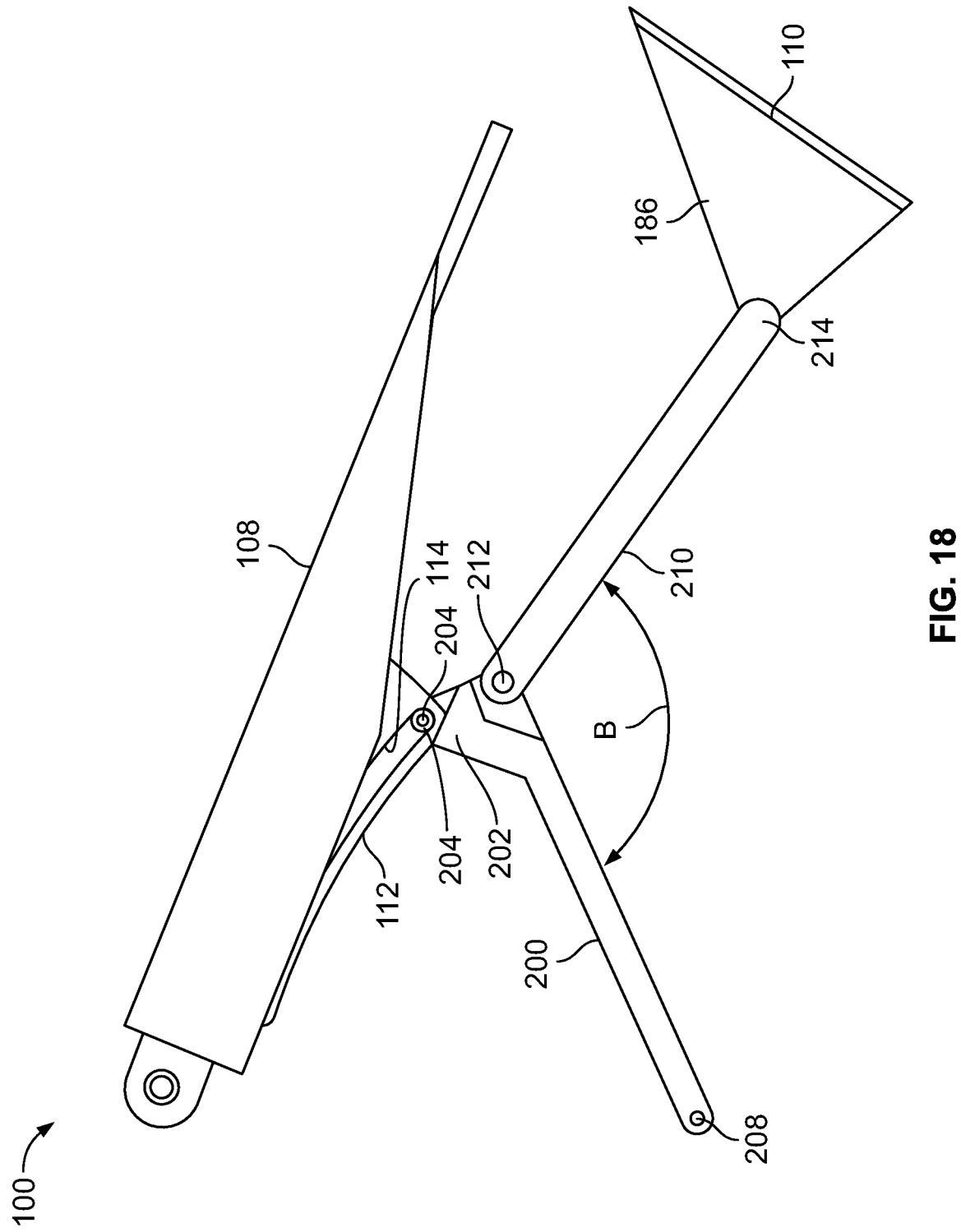
FIG. 18 illustrates a cross-sectional view of a camber adjustment system with the flap in a fully deployed position, according to an example of the present disclosure.

FIG. 17 illustrates a cross-sectional view of a camber adjustment system 100 with the flap 110 in a retracted position. FIG. 18 illustrates a cross-sectional view of the camber adjustment system 100 with the flap 110 in a fully deployed position. The coupler 112 that couples the droop panel 108 to the flap 110 via the first link bar 200 and the second link bar 210 causes the droop panel 108 to move in response to movement of the flap 110 similar to as described above. When the flap 110 is in the retracted position, the first link bar 200 forms an angle A with the second link bar 210, such that the second end 208 of the first link bar 200 is relatively close to the second end 214 of the second link bar 210. As the flap 110 moves to the fully extend position, the guide pin 204 moves towards and into an opposite end of the track 114, thereby causing the first link bar 200 and the second link bar 210 to spread apart about the pivotal coupling of the first end 212 of the second link bar 210 and the first link bar 200, thereby causing the second end 208 of the first link bar 200 and the second end 214 of the second link bar 210 to spread away from each other. As such, the first link bar 200 and the second link bar 210 move towards an expanded angle B therebetween, which is greater than the angle A. When the flap actuator 118 (shown in FIG. 1) moves the flap 110 back to the retracted position, the camber adjustment system 100 moves back from the configuration shown in FIG. 18 to the configuration shown in FIG. 17.

As described herein, the camber adjustment systems 100 include the coupler 112 having the arcuate track 114. The droop panel 108 moves in response to the flap 110. As such, a separate and distinct dedicated droop actuator is not necessary.

The length and radius of the track 114 may be tailored to meet exact positional requirements of the droop panel 108 and the flap 110 at each and every particular position along a range of motion of the flap 110, in contrast to certain previous linkages that typically ensure only three positions of accuracy. Further, the camber adjustment systems 100 reduce the number of components within the wing 102, thereby allowing for thinner and lighter wings. Moreover, because of the compact, simplified design of the camber adjustment systems 100, additional space is available within the wing 102 for various other components (such as wiring, hydraulic lines, and/or the like).

Figure 19:
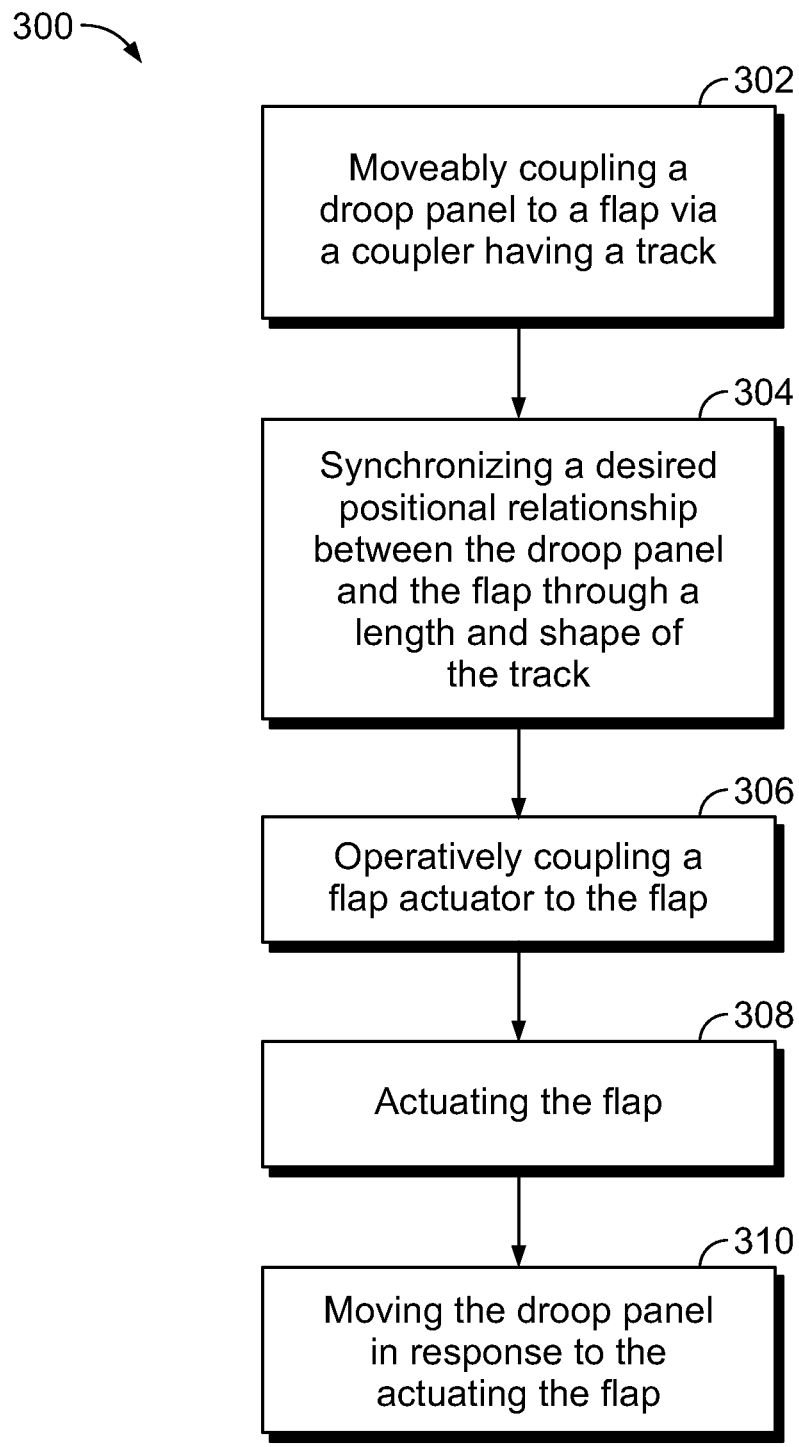
FIG. 19 illustrates a flow chart of a camber adjustment method for a wing of an aircraft, according to an example of the present disclosure.

FIG. 19 illustrates a flow chart of a camber adjustment method 300 for a wing of an aircraft, according to an example of the present disclosure. Referring to FIGS. 1-19, the method 300 includes moveably coupling (for example, pivotally coupling) the droop panel 108 to the flap 110 via the coupler 112 having the track 114 at 302. The moveably coupling 302 may include pivotally coupling the link arm 116 or the link bars 200 and 210 to the coupler 112 and the flap 110.

The method 300 also includes at 304 synchronizing the desired positional relationship of the droop panel 108 in relation to the flap 110 over an entire range of motion of the flap 110 and the droop panel 108. In particular, the synchronizing 304 may include synchronizing the desired position relationship between the droop panel 108 and the flap 110 through the length and the shape of the track 114.

The method 300 also includes at 306 operatively coupling the flap actuator 118 to the flap 110. At 308, the method 300 includes actuating the flap 110. At 310, the actuating 308 causes moving the droop panel 108 in response thereto via the coupler 112. The moving 310 occurs between a retracted (such as a stowed) position and a deployed (for example, fully extended) position.

As described herein, examples of the present disclosure provide camber adjustment systems and methods that include pivot connections and couplers having tracks. The tracks provide reliable, predictable, and efficient positional accuracy of the droop panel in relation to the flap throughout a range of motion between a retracted position and a fully deployed position of the flap. The camber adjustment system may be packaged within thinner and smaller wings.

Examples of the present disclosure provide compact and efficient camber adjustment systems that occupy a reduced amount of space within a wing. Further, examples of the present disclosure provide lighter and less complex camber adjustment systems and methods. The camber adjustment systems and methods may be devoid of a dedicated droop actuator, and/or a relatively large number of pinned connections between a droop panel and a flap.

While various spatial and directional terms, such as top, bottom, lower, mid, lateral, horizontal, vertical, front and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples of the disclosure without departing from their scope. While the dimensions and types of materials described herein are intended to define the parameters of the various examples of the disclosure, the examples are by no means limiting. Many other examples will be apparent to those of skill in the art upon reviewing the above description. The scope of the various examples of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A camber adjustment system for a wing of an aircraft, the camber adjustment system comprising:
    a droop panel that is configured to pivotally couple to a portion of a wing;
    a flap; and
    a coupler having a track that moveably couples the droop panel to the flap, wherein the droop panel is configured to move in response to movement of the flap via the coupler.

2. The camber adjustment system of claim 1, devoid of a dedicated droop actuator.

3. The camber adjustment system of claim 1, further comprising a flap actuator operatively coupled to the flap, wherein the flap actuator is configured to move the flap between a retracted position and a fully deployed position.

4. The camber adjustment system of claim 1, wherein the coupler is integrally formed with the droop panel.

5. The camber adjustment system of claim 1, wherein the track is an arcuate channel formed through a portion of the coupler.

6. The camber adjustment system of claim 1, wherein the droop panel comprises an upper surface, a lower surface, a leading edge, and a trailing edge, wherein a hinge coupling forwardly extends from the leading edge, and a track coupling downwardly extends from the lower surface, wherein the hinge coupling is configured to pivotally couple the droop panel to a hinge fitting of a main body of the wing, and wherein the track coupling couples the droop panel to the track of the coupler.

7. The camber adjustment system of claim 1, wherein the coupler comprises an arcuate head connected to an intermediate body, which, in turn, connects to a foot, wherein the track extends through the head, and wherein the intermediate body is pivotally coupled to a hinge fitting of a main body of the wing.

8. The camber adjustment system of claim 1, further comprising a link arm that couples the coupler to the flap.

9. The camber adjustment system of claim 8, wherein the link arm comprises a first end connected to a second end via a longitudinal body, wherein the first end is pivotally coupled to the coupler, and wherein the second end is pivotally coupled to a flap attach fitting of the flap.

10. The camber adjustment system of claim 1, wherein the coupler extends downwardly from a lower surface of the droop panel.

11. The camber adjustment system of claim 10, further comprising:
    a first link bar moveably coupled to the track, wherein the first link bar is also configured to be pivotally coupled to a hinge fitting of a main body of the wing; and
    a second link bar pivotally coupled to the first link bar, wherein the second link bar is also pivotally coupled to a flap attach fitting of the flap.

12. A camber adjustment method for a wing of an aircraft, the camber adjustment method comprising:
    pivotally coupling a droop panel that is pivotally coupled to a portion of the wing to a flap via a coupler having a track, wherein the track is an arcuate channel formed through a portion of the coupler; and
    moving the droop panel in response to movement of the flap via the pivotally coupling.

13. The camber adjustment method of claim 12, further comprising:
    operatively coupling a flap actuator to the flap; and moving the flap between a retracted position and a fully deployed position via the operatively coupling.

14. The camber adjustment method of claim 12, further comprising integrally forming the coupler with the droop panel.

15. The camber adjustment method of claim 12, further comprising pivotally coupling a hinge coupling of the droop panel to a hinge fitting of a main body of the wing, and wherein the pivotally coupling the droop panel comprises coupling a track coupling of the droop panel to the track of the coupler.

16. The camber adjustment method of claim 12, further comprising pivotally coupling an intermediate body of the coupler to a hinge fitting of a main body of the wing.

17. The camber adjustment method of claim 12, wherein the pivotally coupling the droop panel comprises coupling the coupler to the flap via a link arm.

18. The camber adjustment method of claim 17, wherein the coupling comprises:
  pivotally coupling a first end of the link arm to the coupler; and
  pivotally coupling a second end of the link arm to a flap attach fitting of the flap.

19. The camber adjustment method of claim 12, wherein the pivotally coupling the droop panel comprises:
  moveably coupling a first link bar to the track;
  pivotally coupling the first link bar to a hinge fitting of a main body of the wing;
  pivotally coupling a second link bar to the first link bar; and
  pivotally coupling the second link bar to a flap attach fitting of the flap.

20. An aircraft comprising:
a fuselage; and
wings outwardly extending from the fuselage, wherein each of the wings comprises a main body and a camber adjustment system connected to the main body, wherein the camber adjustment system comprises:
  a droop panel comprising an upper surface, a lower surface, a leading edge, and a trailing edge, wherein a hinge coupling forwardly extends from the leading edge, wherein the hinge coupling pivotally couples the droop panel to a hinge fitting of the main body;
  a flap;
  a coupler having a track that moveably couples the droop panel to the flap, wherein the track is an arcuate channel formed through a portion of the coupler, wherein the droop panel is configured to move in response to movement of the flap via the coupler; and
  a flap actuator operatively coupled to the flap, wherein the flap actuator is configured to move the flap between a retracted position and a fully deployed position.

\* \* \* \* \*